May 31, 1960

H. A. TOULMIN, JR  2,938,782
METHOD AND OPERATION OF BLAST FURNACES
AND METALLURGICAL FUELS THEREFOR
Filed April 24, 1956

INVENTOR.
HARRY A. TOULMIN, Jr.
BY
Toulmin & Toulmin
Attorneys

United States Patent Office 2,938,782
Patented May 31, 1960

2,938,782

METHOD AND OPERATION OF BLAST FURNACES AND METALLURGICAL FUELS THEREFOR

Harry A. Toulmin, Jr., Dayton, Ohio, assignor to The Commonwealth Engineering Corporation, Dayton, Ohio, a corporation of Delaware Filed Apr. 24, 1956, Ser. No. 580,254

1 Claim. (Cl. 75—41)

This invention relates to a method of operation of blast furnaces and metallurgical fuels therefor.

In prior art methods of smelting metallurgical ores in refractory shaft type blast furnaces, the ore, as in the case of iron ore, is introduced at the top of the shaft along with fuel, such as coke and slag-forming constituents, e.g., limestone and the like. The coke not only supplies fuel for heating the mass but functions as a reducing agent to reduce metal oxides to metal. To heat the ore and flux mixture to a temperature to bring about calcination of the ore and recovery of the metal, which in the production of pig iron generally approximates 1000 to 1500° F., a hot blast of air is introduced near the bottom of the furnace through tuyeres. Metal reduced from the ore collects in the lower part of the blast furnace and is drawn off periodically. The old method of operation, however, has many drawbacks and disadvantages. Among these is the difficulty of providing a satisfactory change, the same tending to become compact and dense, thus slowing down the desired reactions. Also the charge tends to "stick" and not move downward through the furnace at a uniform rate of speed.

The present invention provides an improved blast furnace and method of operation wherein the fuel for heating the blast furnace comprises powdered metal admixed with coal dust, hydrogen and oxygen and which is introduced into the furnace through the tuyeres and burned to smelt the charge.

A principal object of the invention is to provide a process for operating a blast furnace utilizing improved fuel, and whereby temperatures on the order of 4000 to 6000° F., or even higher, may be produced within the furnace. Such high temperatures make it possible to smelt ores containing aluminum, titanium and the like which require very high temperatures to calcine and reduce the oxides to metal.

Another object of the invention is to provide an improved blast furnace for treating metallurgical ores and the like to recover the metal therefrom.

Another object of the invention is to provide a high temperature blast furnace for smelting ores and the like, and wherein the fuel comprises a mixture of metal dust, coal dust, metallic soap, and air, oxygen or hydrogen, the solid constituents of the fuel being in the form of fine (preferably a micron or less) size particles which are admixed with hydrogen and air and introduced in the form of a blast through the tuyeres.

Another object is to provide an improved fuel for blast furnaces, which fuel may be in the form of a slurry comprising liquid hydrocarbons, such as kerosene admixed with metal dust, coal dust, and metal stearate, the constituents of the fuel mixture being such as to produce a high temperature on burning.

It is another object of this invention to provide an improved fuel for blast furnaces which fuel comprises particles of metal dust coated with fatty acid soap, e.g., aluminum stearate, palmitate and the like.

Another object of the invention is to provide a method of operating blast furnaces which eliminates the need of hot stoves for preheating air for the blast furnace, and eliminates the need of charging the blast furnace with successive layers of ore, limestone and coke as is common practice.

Another object of the invention is to provide a novel high temperature burning fuel mixture which comprises metal powder and coal particles which are admixed with hydrogen, air or oxygen and burned inside the furnace, the particle size of the solids ranging from one-half micron or less to 200 microns in diameter, the size being predetermined by the speed of the combustion desired and flame propagation required during combustion of the fuel. The higher temperatures developed by the burning fuel mixture under reducing atmospheric conditions within the furnace brings about direct reduction of the metal oxides to metal.

Still another object of the invention is to provide a blast furnace structure wherein fuel consisting of metal powder mixed with carbon particles and combustible gases with or without atomized liquid fuel is injected along with hydrogen and air into the blast furnace and centrally of the charge and burned to smelt and reduce the ore. High temperatures for calcination and reducing metallurgical ores is produced at the central bosh section of the furnace by inclining the tuyeres and directing the blast of air and fuel mixture upward at a suitable angle to the horizontal so as to form a cone-shaped combustion area with the apex section extending upwardly and centrally of the furnace. The tuyeres which are spaced circumferentially about the furnace and inclined upwardly at the same angle cause the fuel blast to converge centrally of the blast furnace and below the top of the furnace. The high temperature zone is thus spaced from the side walls of the furnace so that the refractory furnace lining is maintained at a sufficiently low temperature to protect it.

The process and apparatus of the present invention makes it possible to operate blast furnaces at a much higher temperature than has been possible heretofore to effect the smelting and reduction of metallurgical material. This takes place as the mass moves downwardly through the blast furnace and without causing fusion and sticking of the material to the side walls of the furnace such as is often encountered during the operation of conventional blast furnaces. Where the hot blast is directed against the side walls of the furnace the ore mass fuses and sticks thereto, thus blocking the downward movement of the stock, and interrupting the smooth operation of the furnace. Introduction of the fuel mixture directly into the furnace upward and centrally of the bosh section in accordance with my invention overcomes these difficulties and provides a high temperature operating blast furnace.

The invention is particularly useful for smelting and refining ores, and such as contain aluminum, magnesium, titanium, zirconium, manganese and the like, which are very difficult to smelt and refine in conventional blast furnaces. By-product gases produced during operation of the furnace which include reducing gases such as hydrogen, carbon monoxide, and the like, bring about rapid reduction and smelting of the material. In addition, use of these combustible reducing gases together with the powdered metal and coal dust and introduced through the tuyeres permits continuous or discontinuous operation of the blast furance without interfering with the quality of the product. Continuous operation of the furnace as in conventional blast furnaces is thus unnecessary.

The invention is particularly useful in the smelting and recovery of titanium metal which melts at 1800° C. (3272° F.) as well as aluminum, zirconium and the like metallurgical ores which are difficult to smelt. The fuel blast is injected into the furance through tuyeres along with sufficient air or oxygen and hydrogen to provide a highly combustible reducing gaseous fuel mixture which burns rapidly to completion and heats the charge to a very high temperature. Utilization of preheaters, such as stoves, as aforementioned, is unnecessary. By-product gases may be drawn off from the top of the blast furnace and utilized to heat steam or the like to operate blowing engines for introducing the hydrogen, air or oxygen-enriched air into the furnace under pressure, the gas functioning both as a high temperature fuel and carrier for the solid fuel constituents.

The invention is further illustrated by one embodiment as shown in the drawings attached herewith, and in which.

Figure 1:
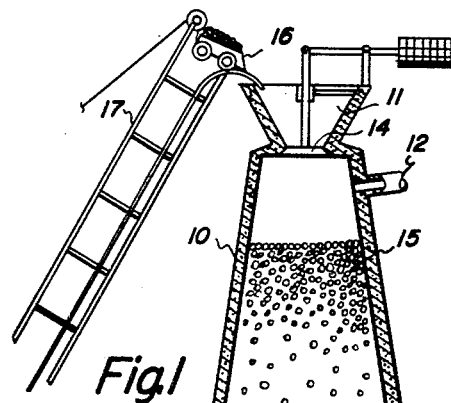
Figure 1 is a view in vertical longitudinal section taken through a blast furnace and illustrating the inclined tuyeres for introducing the fuel into the lower part of the furnace, and providing a cone-shaped high temperature zone.
Figure 2:
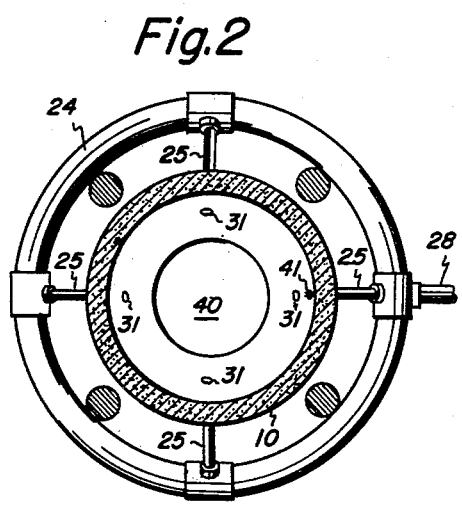
Figure 2 is a horizontal cross-section taken through the furnace substantially on the line 2—2 of Figure 1, and looking in the direction of the arrows.

Referring to the drawings in more detail, a shaft type refractory lined blast furnace structure 10 is illustrated having a charging hopper 11, and downcomer or gas take-off 12 at the top of the furnace. For closing the furnace, a bell-shaped valve 14 is provided as shown in Figure 1. Metallurgical ore, coke and fluxing constituents, and forming the material 15 to be smelted, is conveyed to the top of the furnace in suitable trucks 16, as hauled by a hoist 17, the material being discharged into the hopper 11.

Tuyeres generally indicated at 18 are arranged circumferentially about the furnace at the combustion zone 20, the fuel being introduced through tuyeres spaced circumferentially around the furnace and inclined approximately 45° to the horizontal. The fuel mixture is delivered from the tuyeres in the form of a blast and directed upwardly to form a cone-shaped fusion zone 21. The high temperature burning fuel mixture containing powdered metal and coal is fed to the furnace through a manifold pipe 24 which extends around the furnace, the latter being connected to the tuyeres through pipe sections 25. The tuyeres may be provided with a water cooling jacket, as is conventional, and the cooling water force circulated about the part to prevent over-heating of the tuyeres or furnace part.

The solid and liquid constituents of the fuel are mixed and blended in a homogeneous mass in a suitable mixer, as indicated generally at 27, and delivered under pressure, e.g., 25–60 p.s.i. depending upon the size of the furnace, with the combustible gas to the manifold pipe 24 through pipe line 28. A valve 29 is provided in line 28 for controlling the flow of fuel to the manifold pipe 28.

Figure 3:
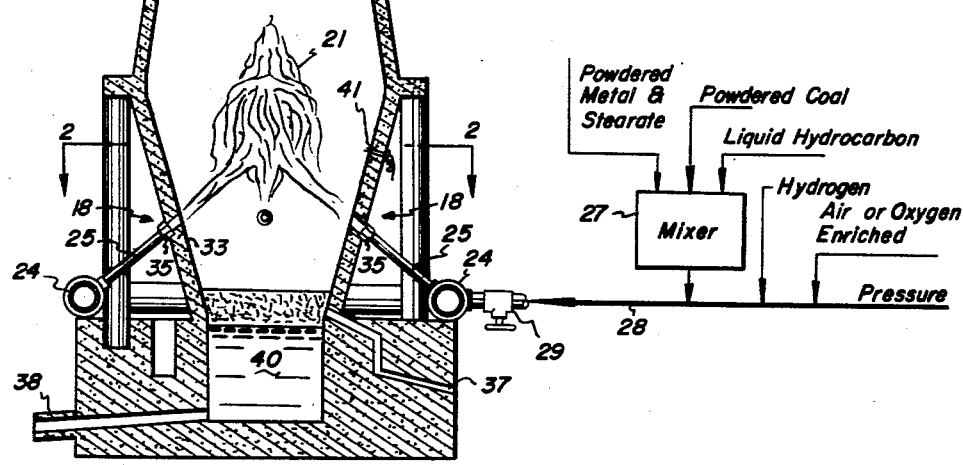
Figure 3 is a fragmentary view partly in section and on an enlarged scale, showing the tuyere construction.
Figure 3:
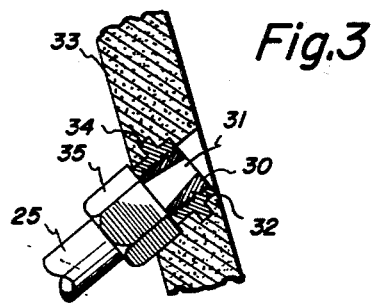

The tuyeres 18, as illustrated in Figure 3, are provided with tapered nozzle sections 30, the discharge opening 31 of which is of a diameter to readily pass the powdered particles of metal and coal, the nozzle section 30 being threaded into an outer tubular member 32 which in turn is interlocked in the wall section 33 of the furnace as by means of an annular ring or abutment 34. The tubular tuyere member 32 is externally threaded to receive a nut 35 for securing the connector pipes 25 in place.

The furnace is suitably provided with drain notch 37 for draining off slag. A drain notch 38 is used for withdrawing metal from the well 40. These notch openings are temporarily closed by fire clay or the like, which is removed when it is desired to draw off slag or metal. An electrically operated resistance heater 41 is also provided to initiate the burning of the fuel.

Operation of the blast furnace is similar as in the ordinary furnace, except that the fuel introduced into the tuyeres comprises a mixture of metal particles, such as aluminum, magnesium or mixtures thereof, the particles of which are preferably coated with metallic soap such as metal stearates, palmitates and the like, the same being introduced together. Preferably the metal particles are precoated with metallic soap. Powered coal is admixed with the metal powder and blown into the combustion zone along with hydrogen and air or oxygen-enriched air to provide a completely combustible fuel mixture.

A high calorific fuel such as that disclosed and claimed in my copending applications may be utilized in the operation of this furnace in accordance with the invention. Such improved fuels for operating jet airplane engines, gas turbines, rockets, power plants and the like and which evolve a large amount of heat and burn at high temperatures are disclosed in my copending applications Serial Nos. 451,307; 453,933; and 459,079. In each of these applications there is disclosed a catalyzed gaseous fuel containing solid metal particles with and without coal or carbonaceous particles for producing a high temperature burning fuel mixture.

A fuel mixture of exceptionally high value consists of a combination of coal dust (particle size averaging less than one micron) together with aluminum metal particles of approximately one micron or less size, which particles are coated with aluminum stearate or the like metallic soap catalyst, the solid fuel particles being admixed with hydrogen or hydrogen peroxide to provide a completely combustible fuel.

A typical fuel blast comprises as the gaseous carrier a mixture (by volume) of hydrogen 50%, oxygen 25% and and air 25%. To each pound of this gaseous mixture, as measured at atmospheric pressure, there is introduced, in parts by weight, three ounces of solid fuel consisting of a mixture of one part aluminum metal powdered, the particles of which are coated with aluminum stearate, and two parts coal dust, the solid particles of the metal and coal dust averaging approximately one micron.

In operating a blast furnace for smelting of iron ore, for example, approximately 7000 pounds of air is used per ton of pig iron. About 1800 pounds of coke is required per ton of iron and about 1000 pounds of limestone with approximately 3800 pounds of iron ore.

In the preferred operation of the blast furnace in accordance with the invention, the heat evolved at in the fusion zone by burning of the hydrogen and gaseous fuel mixture is increased to provide much higher temperatures by the addition of from about 1 to 10% by weight of solid fuel containing finely divided light metal as a principal constituent. A preferred fuel mixture for addition to the tuyere air blast comprises powdered metal and powdered coal in the relative proportionate amounts by weight of 1 to 2 parts coal dust to one-half to 1 part of powdered metal, e.g., aluminum flakes coated with aluminum stearate as described. The presence of small amounts of stearate, e.g., 0.01 to 0.1% of the powdered metal functions to catalyze and increase the rate of combustion of the metal particles and evolve more heat.

A high temperature fuel fired furnace is thus provided and, due to the increased temperature created in the fusion zone, the addition of coke to the charge may be dispensed with or reduced to as much as one-fourth to a half of that ordinarily required. The reactions which take place and heat evolved during burning of the fuel mixture are sufficient to smelt the ore, once started. Air as introduced at the tuyeres is preferably enriched with 10 to 25% by volume of pure oxygen. This increases the combustion rate of the fuel and heat evolved. Preferably the gaseous blast is introduced at a rate to maintain approximately 10 p.s.i. (gage) pressure within the furnace. Hydrogen is suitably supplied from a gas generator source and is utilized as the principal gas, being preferably supplied at the ratio of two volumes hydrogen to one of oxygen or air to burn the hydrogen.

For supplying carbon monoxide enriched gas, as well as hydrogen, to the air blast, a portion of the furnace by-product gas may be conducted from the top of the furnace through a downcomer pipe and introduced into the gaseous blast delivered to the tuyeres. Any flue dust is first removed by the use of a cyclone separator or the like before conducting the gas to the tuyeres.

The particle size of the solid particles preferably are relatively uniform and on the order of one-half micron or less, up to 200 microns. Metal particles of a small size, e.g., one micron or less, produce a highly and rapidly combustible mass when ignited with hydrogen, air or oxygen, especially in the presence of a small amount of metallic soap such as aluminum or magnesium stearate. While the metal dust and metallic soap may be used alone with hydrogen as the fuel addition agent, a mixture of finely divided bituminous coal and metal dust is especially useful, and preferably where the coal forms the major component. A mixture in parts by weight of one part powdered metal to 2 to 3 parts powdered coal provides a suitable fuel solids mixture.

Using hydrogen gas as a constituent of the fuel mixture, the metal oxides are more readily reduced to metal and a hotter blast is provided. In the case of iron ore smelting, the hydrogen gas blown into the charge reduces the ore directly to metallic iron and due to the presence of powdered metal and coal which gasify and burn, complete combustion of the fuel mixture takes place. Thus improved smelting and more efficient operation of the blast furnace is attained.

The solid fuel mixture may be added as a fluidized mass to the gaseous blast passing to the tuyeres or admixed with a liquid combustible carrier, e.g., light grade fuel oil, kerosene or the like liquid hydrocarbon, the slurry mash being added and atomized as it is discharged from the tuyere nozzles. The introduction of metallic soap in small proportionate amounts for example 0.1 to 2% by weight of the metal powder or solid constituents of the fuel catalyzes and enhances the combustion rate and produce a higher temperature of reaction.

As fatty acid metal catalyst there may be used stearates, palmitates, oleates, ricinoleates, etc., of the light metals, e.g., aluminum, magnesium, tin and the like. Aluminum flakes of metal spray coated with the metallic fatty acid catalyst is suitable for use. The fuel mixture containing the powdered metal is forced into the furnace through the tuyeres along with air or oxygen enriched air blast.

For promoting the oxidation and increasing the speed of burning of the fuel, a small amount of a peroxide, such as hydrogen or benzyl peroxide, etc., may be introduced into the fuel mixture initially or during the burning of the same. For this purpose, 0.5 to 1% by weight of the fuel solids may comprise hydrogen or benzyl peroxide.

As specific examples of a powdered metal fuel for introduction into the air blast at the tuyeres, a powdered aluminum metal foil having a particle fineness of about one micron and coated with aluminum stearate (0.1 to 5% by weight of the powdered metal mixture) may be used. In place of aluminum metal, magnesium metal or other readily oxidizable metals such as zinc, tin, zirconium, titanium, etc. metal particles in the form of dust or flakes, may be employed. Aluminum flakes coated with a small amount of aluminum or magnesium stearate, or the like metallic soap as aforementioned, provides a suitable fuel mixture and which is preferably introduced in amounts up to 10% by weight of the total fuel mixture including the combustible gaseous constituents.

The proportionate amount of the fuel mixture introduced into the furnace through the tuyeres as described in a given instance depends largely upon the material being smelted and the desired fusion temperature to be developed in the furnace. Further, by adjusting the relative proportionate amount of the combustible constituents used to make up the fuel mixture, different fusion temperatures can be produced in the furnace.

The fuel mixture is blown into the combustion zone of the furnace as a continuous blast, the solid fuel being mixed with hydrogen, air or oxygen, as described, and burned to provide a high temperature fusion zone centrally within the furnace charge. When liquid hydrocarbon carrier is used, 10 to 25 parts by weight of the solid fuel constituents to 100 parts by weight of the liquid hydrocarbon provides a suitable fuel which is introduced as an atomized mixture into the charge along with hydrogen and air or the like combustible gases. Higher or lower proportionate amounts of the liquid hydrocarbon and powdered fuel constituents may be employed as desired to provide a fuel having the requisite consistency and burning characteristics. Powdered metal may be mixed with the liquid hydrocarbon either before or during burning of the fuel.

Heretofore, in the combustion of metal particles, the maximum B.t.u.'s have not been obtained principally because the initial heating of the particles did not result in the production of temperatures high enough to disintegrate and vaporize the metal and permit air or oxygen to come in contact with all the powdered metal particles and support its combustion to completion. In other words, under conventional combustion reactions using powdered metals there was always a certain minimum amount of the particles which were not burned to completion but passed off as smoke.

In accomplishing the high combustion and maximum extraction of B.t.u.'s from powdered metal material in accordance with this invention, and as developed in a blast furnace, it is requisite that the reaction be conducted so that the boiling point or vaporization point of the combustible material be lower than the flame temperature and that the heat of vaporization is lower than the energy required to initiate rapid surface oxidation or combustion.

The catalytic action of metallic soaps facilitates the burning of the metal dust and provides a high temperature reaction so that the maximum B.t.u.'s are obtained from the metal dust particles. During combustion of the fuel the high temperatures produced rapidly transform the metal particles into gases at high temperatures.

The efficiency of the combustion and high extraction of B.t.u.'s is further facilitated due to the catalytic action of the metal particles particularly in the presence of oxygen, hydrogen and carbon monoxide which is formed during smelting of ores and under the high temperature reaction conditions during combustion of the fuel.

To control the combustion and prevent explosion and to facilitate combustion an excess of oxygen in the air blast is preferred and is introduced into the fuel either from the air or from the use of a mixture of air and peroxide, as heretofore explained. In this manner it is possible to produce a very high temperature fusion zone centrally in the furnace and adjacent the tuyeres.

In the case of metal dust such as aluminum dust and similar metal dust particles, the ignition of the same is believed to have an electric or electronic origin as opposed to thermal ignition. The electrical discharges or ionization is believed to produce ozone and aluminum oxide ($Al_2O$) which reacts with the fine dust particles and initiates the decomposition of the same and flame propagation during the combustion of the fuel mixture.

The electrical or thermal ignition of the metal particles depends largely upon the production of a sufficient concentration of charged particles and which results from electronic collisions due to ionization of the materials or the presence of ions or ionized particles in the explosive mixture. This electronic phase of the combustion is thought to play an important role in the increased efficiency of the fuel mixture.

An important feature of the invention is introducing the fuel addition mixture under pressure into the blast furnace and which fuel comprises as an essential constituent metal dust and which is preferably coated with metallic stearate and admixed with coal dust particles, the latter being of an average size less than one micron.

Metal particles or mixtures thereof may be used, such as for example aluminum, magnesium, boron, lithium and the like, and which are combustible and produce a high B.t.u. value. Hydrogen and oxygen are introduced as the gas either alone or admixed with peroxides such as heretofore mentioned to provide a high temperature burning fuel.

As the carbon constituent there may be utilized powdered coal, charcoal, semi-bituminous as well as bituminous, may be used, and which is finely divided and admixed with the other fuel constituents and injected along with the air into the furnace through the tuyeres. The sublimation temperature of coal is on the order of 3000 to 3500° C. or 5400 to 6500° F., and approximates the sublimation temperature of aluminum. The burning of the fuel is initiated and kept burning as the blast furnace operates. Temperatures on the order of 3000 to 7500° F. may thus be provided.

The method of operating a blast furnace in accordance with this invention, provides an exceedingly hot blast temperature within the furnace and practically eliminates the necessity of adding fuel, such as coke, as well as fluxing constituents, e.g., limestone etc. A saving in metallurgical coke and fluxes, as ordinarily required per ton, is thus obtained and a purer metal is produced. This is accounted for in that sulfur and the like impurities unavoidably introduced with the use of coke and fluxing materials are substantially avoided or materially lessened by the use of higher temperature producing air blasts at the tuyeres.

An important structural feature of the furnace is the positioning of the tuyere nozzles so that the flame blasts of the fuel mixture impinge upon one another centrally beneath the charge forming a cone-shaped combustion zone as illustrated in Figure 1 of the drawing. In this manner the high temperature blast is directed into the charge and away from the side walls of the furnace. This results in keeping the walls relatively cool and prevents sticking of half smelted charge or material to the walls of the blast furnace. Such sticking requires shutting down of furnace operation with loss of production.

The invention has been described with particular reference to the preferred embodiment as illustrated in the drawings and with respect to preferred fuel addition mixtures for introducing into the blast furnace; it will be understood, however, that modifications of the furnace and fuel mixtures may be made by those skilled in the art to provide a modified blast furnace operation as desired.

The invention is more particularly set forth in the appended claim hereinafter.

What is claimed is:

In the method of smelting metallurgical materials in a refractory shaft blast furnace for smelting metallurgical ores, wherein the ore is introduced into a refractory shaft along with coke and slag-forming constituents and heated by a reducing gas blast directed into the ore to smelt and reduce the same to metal, the improvement which consists in introducing along with the gas blast from 1 to 10% by weight of a mixture consisting of finely divided particles of aluminum metal and coal particles, said finely divided aluminum metal particles having a coating on said particles of aluminum stearate, said aluminum stearate constituting from 0.1 to 5% by weight of said finely divided aluminum metal particles, and said mixture being introduced into said furnace together with a carrier gas composed of air, oxygen, and hydrogen in the proportion by volume of 50% hydrogen, 25% air, and 25% oxygen.

References Cited in the file of this patent
UNITED STATES PATENTS

| | | |
|---|---|---|
| 502,482 | Dauber | Aug. 1, 1893 |
| 914,830 | Harper, Jr. | Mar. 9, 1909 |
| 943,599 | Hubbard | Dec. 14, 1909 |
| 1,024,136 | Kelly | Apr. 23, 1912 |
| 1,506,323 | O'Neill | Aug. 24, 1924 |
| 1,518,854 | Kirby | Dec. 9, 1924 |
| 1,532,930 | O'Neill | Apr. 7, 1925 |
| 1,997,603 | Spalding | Apr. 16, 1935 |
| 2,023,025 | McKee | Dec. 3, 1935 |
| 2,087,842 | Gerwig | July 20, 1937 |
| 2,140,181 | Bangle | Dec. 13, 1938 |
| 2,436,002 | Williams | Feb. 17, 1948 |
| 2,530,489 | Van Loenen | Nov. 21, 1950 |
| 2,530,492 | Van Loenen | Nov. 21, 1950 |
| 2,560,542 | Bartleson et al. | July 17, 1951 |
| 2,579,257 | Hansley et al. | Dec. 18, 1951 |
| 2,669,511 | Whitney | Feb. 16, 1954 |
| 2,800,172 | Romer et al. | July 23, 1957 |

FOREIGN PATENTS

| | | |
|---|---|---|
| 6,783 | Great Britain | 1894 |

OTHER REFERENCES

Camp & Francis, The Making Shaping and Treating of Steel, 6th edition, United States Steel, Pittsburgh, Pa. (Pages 294–308, pages 295 and 296, Figs. 103 and 104, respectively relied on).